UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

ORANGE-YELLOW DYE.

SPECIFICATION forming part of Letters Patent No. 452,197, dated May 12, 1891.

Application filed March 7, 1891. Serial No. 384,143. (No specimens.)

*To all whom it may concern:*

Be it known that I, JAKOB SCHMID, a citizen of Switzerland, residing at Basle, Switzerland, have invented new and useful Improvements in the Production of an Orange-Yellow Coloring-Matter or Dye-Stuff, of which the following is a specification.

This invention relates to a new coloring-matter or dye-stuff obtained by the combination of a diazo compound of salicylic acid, or its homologues, with resorcin.

As an example by which my new coloring-matter may be prepared I give the following: Ten parts, by weight, of paraamido salicylic acid, or of a mixture of a para and ortho amido salicylic acid, obtained by reduction of crude nitro-salicylic acid, are converted into the diazo compound by a cooled aqueous solution of ten parts of muriatic acid and 3.5 parts of sodium nitrite. The product is slowly poured into a solution of 5.5 parts of resorcin in an alkali—such, for instance, as a solution of twenty parts of ammonia in twenty parts of water. After a short rest the ammonium salt of the dye-stuff separates out as an orange-yellow mass. By addition of common salt the precipitation becomes complete. The dye-stuff is filtered off and dried, or directly used in paste.

The coloring-matter in the form of its ammonium salt is an orange-brown powder, which dissolves easily in cold and hot water, with an orange-yellow color. It is soluble in alcohol, with a yellow color, insoluble in benzine and ether, and has the following composition:

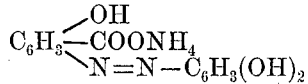

It dyes orange-yellow on mordanted cotton and on wool. When used on cotton mordanted with chrome, the color resists soaping very well. The tints obtained on chrome-mordants are orange-yellow, and those on iron-mordants are brown. On wool it dyes very even tints, and if fixed with a mordant it is very fast in milling.

When homologues of salicylic acid are used in the preparation of my new coloring-matter in place of salicylic acid, the composition is as follows:

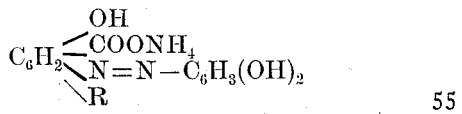

where R represents methyl ($CH_3$), or ethyl $C_2H_5$ or propyl $C_3H_7$ or their homologues of the series $C^nH^{2n+1}$.

What I claim as new, and desire to secure by Letters Patent, is—

The orange-yellow dye-stuff or coloring-matter hereinbefore described, derived from salicylic acid and resorcin, which appears in the form of an orange-brown paste, or when dry as an orange-brown powder, and which is easily soluble in water and in alcohol and insoluble in benzine.

In testimony whereof I have hereunto set my hand and seal in the presence of two subscribing witnesses.

JAKOB SCHMID.

Witnesses:
 GEORGE GIFFORD,
 CHAS. A. RICHTER.